United States Patent [19]
Claeys et al.

[11] Patent Number: 5,442,905
[45] Date of Patent: Aug. 22, 1995

[54] INTEGRATED POWER AND COOLING ENVIRONMENTAL CONTROL SYSTEM

[75] Inventors: Henry M. Claeys, Lomita; Kathrine J. Clarke, Hermosa Beach; Dan S. Matulich, Rolling Hills Estates, all of Calif.

[73] Assignee: AlliedSignal Inc., Morris Township, N.J.

[21] Appl. No.: 224,938

[22] Filed: Apr. 8, 1994

[51] Int. Cl.6 .............................. F02C 6/06
[52] U.S. Cl. ................ 60/39.07; 60/39.183; 454/71
[58] Field of Search ............. 60/39.07, 39.183, 39.33, 60/37.83; 454/71, 76

[56] References Cited

U.S. PATENT DOCUMENTS

| | | |
|---|---|---|
| 2,582,848 | 1/1952 | Price . |
| 2,734,356 | 2/1956 | Kleinhans ............... 60/39.183 |
| 2,734,443 | 10/1951 | Wood . |
| 2,777,301 | 1/1957 | Kuhn . |
| 2,961,939 | 11/1960 | Typaldos ............... 454/71 |
| 3,177,679 | 4/1965 | Quick et al. . |
| 3,279,169 | 10/1966 | Bayard . |
| 3,326,109 | 6/1967 | Markham . |
| 3,834,161 | 9/1974 | Quigley, Jr. et al. . |
| 4,091,613 | 5/1978 | Young . |
| 4,196,773 | 4/1980 | Trumpler . |
| 4,261,416 | 4/1981 | Hamamoto . |
| 4,494,372 | 1/1985 | Cronin . |
| 4,503,666 | 3/1985 | Christoff . |
| 4,684,081 | 8/1987 | Cronin . |
| 5,143,329 | 9/1992 | Coffinberry . |
| 5,145,124 | 9/1992 | Brunskill et al. . |

FOREIGN PATENT DOCUMENTS

| | | | |
|---|---|---|---|
| 556531 | 4/1958 | Canada ................ | 454/71 |
| 1459400 | 12/1976 | United Kingdom ....... | 454/71 |

OTHER PUBLICATIONS

SAE Tech. Paper "A Subsystem Integration Technology Concept" (931382) by Carter, Matulich, and Weiss.
SAE Tech. Paper "Concepts for Aircraft Subsystem Integration" (931377) by Burkhard and Haskin.
SAE Tech Paper "High-Temperature Bootstrap Compared w/F-15 Growth Air Cycle Air Conditioning System" (891436) by Matulich.
SAE Tech. Paper "Integrated Aircraft Thermal Management and Power Generation" (932055) by Wiese, Matulich and Weiss.

*Primary Examiner*—Louis J. Casaregola
*Attorney, Agent, or Firm*—Jerry J. Holden; John R. Rafter

[57] ABSTRACT

An environmental control system has an air cycle machine that includes a compressor, a cooling turbine, a motor/generator, and a power turbine all mounted on a single shaft. The power turbine receives bleed air from the aircraft's engine and has a variable geometry inlet nozzle that adjusts the air flow rate therethrough without significant throttling. Downstream of the nozzle the power turbine extracts the expansion energy from the bleed air while cooling it. This is used to drive the other components of the air cycle machine, and in particular the motor/generator which generates electricity.

3 Claims, 1 Drawing Sheet

INTEGRATED POWER AND COOLING ENVIRONMENTAL CONTROL SYSTEM

TECHNICAL FIELD

This invention relates generally to aircraft Environmental Control Systems, (ECS), and in particular to an ECS that provides both conditioned air and electricity to the aircraft.

BACKGROUND OF THE INVENTION

In addition to propulsion, an aircraft's main engines provide shaft power to drive accessories such as electric generators and pumps, and fresh, pressurized air for the aircraft's environmental control system. This air is used to cool or heat, ventilate, and pressurize the aircraft cabin. The extraction of pressurized air and shaft power from the main engines is referred to as parasitic loss, and must be compensated for by increasing fuel consumption. Not surprisingly, aircraft and aircraft engine designers are continuously working on reducing these parasitic losses, and hence reducing the fuel consumption of the main engines.

When the aircraft is on the ground and the main engines are shutdown, many aircraft employ an Auxiliary Power Unit, (APU). An APU is a small gas turbine engine comprising one or more compressors and a turbine mounted on a shaft. A combustor is disposed between the compressor and the turbine. During operation, the compressor supplies pressurized air to the ECS, and the turbine provides shaft horsepower to drive accessories such as an electric generator. Recent technological advances now enable APUs to start and operate during an in flight emergency such as a main engine shutdown. However, under normal in flight operating conditions the burden of providing electricity and pressurized air still falls on the main engines.

One approach to reducing the parasitic losses of the main engines is to combine an APU and ECS into one system and have the APU's compressor continuously provide pressurized air to the ECS. Such systems are disclosed in Cronin; U.S. Pat. Nos. 4,494,372 and 4,684,081. Although these systems eliminate the parasitic loss due the extraction of pressurized air from the main engines, they still require shaft horsepower from the main engines to drive electric generators. Christoff, U.S. Pat. No. 4,503,666 discloses another approach which is to combine an APU and ECS into one system and have the APU drive an electric generator. However, in both the Cronin and Christoff systems the APU consumes fuel. Therefore, though the fuel consumption of the main engines is reduced, the overall fuel consumption of the aircraft is not necessarily reduced.

Accordingly, there is a need for an ECS that can provide both conditioned air and electricity to the aircraft without an increase in fuel consumption.

SUMMARY OF THE INVENTION

An objective of the present invention is to provide an ECS that provides large quantities of conditioned air to an aircraft's cabin as well as supplying all the of the aircraft's electrical needs without an increase of fuel consumption.

The present invention achieves the above-stated objective by providing an ECS that uses the expansion energy of the bleed air to drive an electrical generator while simultaneously cooling the bleed air so for delivery to the aircraft cabin. At the core of this system is an air cycle machine comprising a compressor, a cooling turbine, a motor/generator, and a power turbine all mounted on a single shaft. The power turbine has a variable geometry inlet nozzle that enables it to vary the air flow rate through the turbine and hence to the cabin without throttling the bleed air.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

The sole FIGURE is a schematic representation of an environmental control system contemplated by the present invention having a closed-loop refrigeration air cycle.

DESCRIPTION OF THE PREFERRED EMBODIMENT

Figure 1:
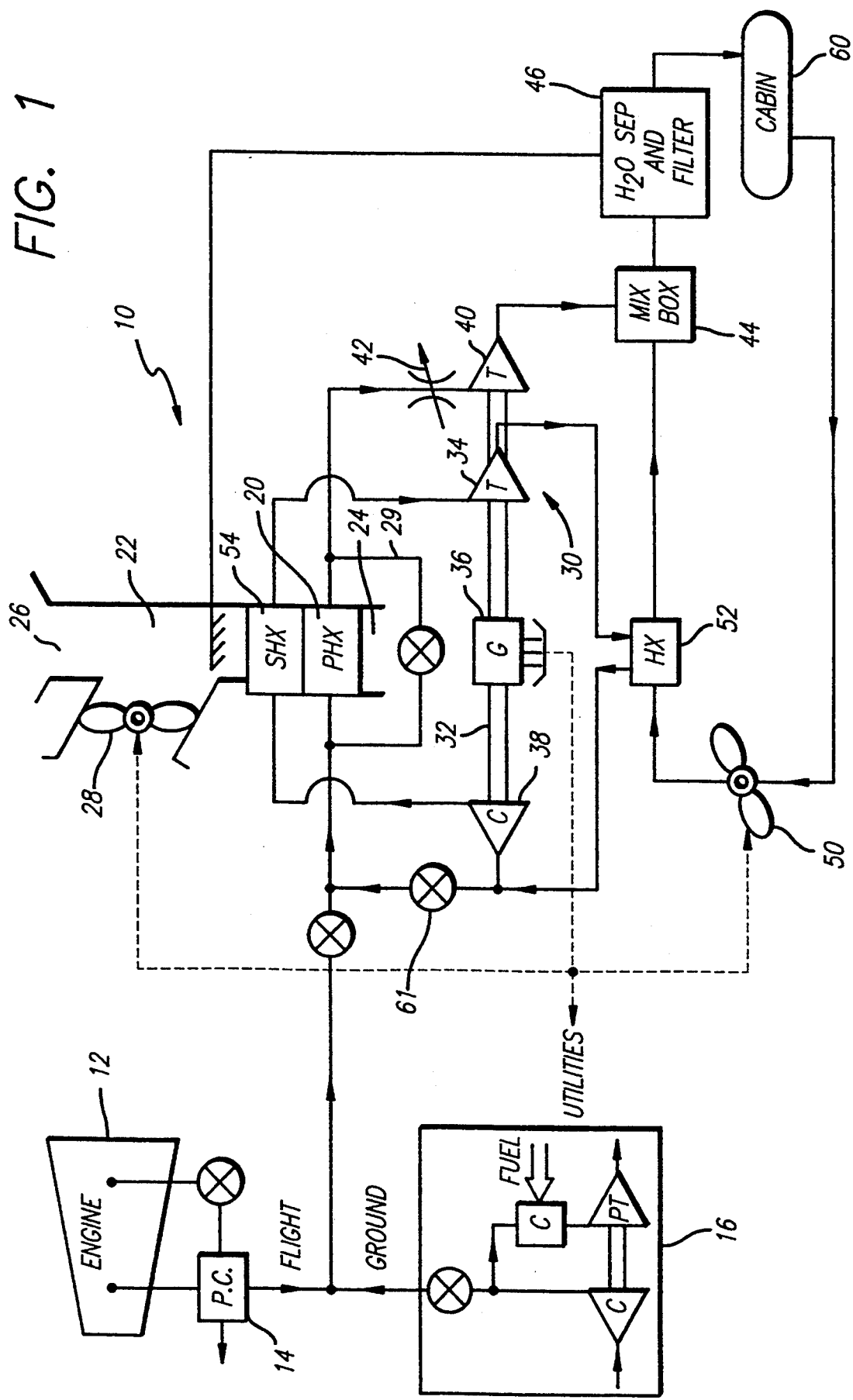

Referring to the drawing, a closed-loop refrigeration air cycle environmental control system (ECS) 10 provides electricity to the aircraft, and conditioned air to the aircraft cabin 60. The ECS 10 receives fresh, pressurized bleed air. from of the main engine 12 via a bleed air precooler 14. When the main engines are shutdown an auxiliary power unit (APU) 16 can be used to supply the fresh air. The bleed air from either the precooler 14 or APU 16 flows through a primary heat exchanger 20 where it is cooled in an air to air heat exchange with a flow of ram air. The primary heat exchanger 20 is mounted in a ram air duct 22 that extends from an inlet 24 to an exit 26. The inlet 24 and exit 26 are open to the atmosphere thus permitting a flow of air through the duct 22 when the aircraft is in motion. An electrically driven fan 28 is disposed in the duct 22 and generates air flow when the aircraft is not moving. To warm the air exiting the primary heat exchanger 20, a portion of the air from the engines can be flowed through a bypass 29.

From the primary heat exchanger 20, the bleed air flows to an air cycle machine 30. The air cycle machine 30 has a single rotating shaft 32 preferably journaled on non-oil lubricated bearings, such as air bearings or magnetic bearings. Mounted on the shaft 32 are a cooling turbine 34, a motor/generator 36, a compressor 38, and a power turbine 40. The power turbine 40 has a variable geometry inlet nozzle 42 that receives the bleed air from the primary heat exchanger 20. The area of the nozzle 42 is adjustable to maintain the required fresh air flow rate to the aircraft cabin 60 as the cabin pressure and main engine bleed pressure changes. That is the nozzle 42 opens when cabin 60 requires more fresh air, and closes when the cabin 60 requires less. Importantly, the nozzle 42 as it opens and closes does not significantly throttle the bleed air. The throttling of the bleed air occurs downstream of the nozzle 42 in the power turbine 40 which converts the air's expansion energy into shaft power for driving the air cycle machine 30, and in particular the motor/generator 36 which now generates electricity for the aircraft. If the aircraft requires hydraulic power, an electrically driven hydraulic pump may be added to the system. The expansion of the air across the power turbine 40 also cools the air. This cooled air then flows to a mix manifold 44 where it is mixed with cooled recirculated air.

A recirculation fan 50 draws air from the cabin 60 and causes the air to flow through a heat exchanger 52 where it is cooled, and then to the inlet of the compressor 38. The compressor 38 also receives a portion of the bleed air through valve 61 from upstream of the primary heat exchanger 20 which is used to pressurize the system. Within the compressor 38 the air is compressed raising its temperature and pressure. From the compressor 38 the air flows through a secondary air-to-air heat exchanger 54 where it is cooled with very little pressure drop. The secondary heat exchanger 54 is also mounted in the ram duct 22 downstream of the primary heat exchanger 20. From the secondary heat exchanger 54, the air flows to the cooling turbine 34 where it is expanded, and cooled to well below ambient temperature. The cooling turbine also generates shaft power to assist the power turbine 40 in driving the shaft 32. The cooled recirculated air then flows through the heat exchanger 52 where it is used as a heat sink, and then to the mix manifold 44 where it is mixed with the fresh air from the power turbine 40. The mixed fresh and recirculated air flows through a water extractor and filter 46, and then to the cabin 60. The extracted water is dumped into the ram duct 22 upstream of the secondary heat exchanger 54.

Thus, the ECS 10 is able, without requiring an increase in the aircraft's fuel consumption, to provide conditioned air to the cabin 60 while simultaneously driving the motor/generator 36.

Various modifications and alterations to the above described preferred embodiment of the environmental control system will be apparent to those skilled in the art. For example, instead of the closed-loop refrigeration cycle the system can operate with a closed-loop refrigeration vapor cycle. Accordingly, the description of the invention should be considered exemplary and not as limiting the scope and spirit of the invention as set forth in the following claims.

What is claimed is:

1. An environmental control system for an aircraft having a cabin and at least one engine providing fresh pressurized air, said system comprising:
    a single shaft;
    a power turbine mounted on said shaft and receiving said fresh, pressurized air from said engine, said power turbine having a variable geometry inlet nozzle;
    a motor/generator mounted on said shaft;
    a compressor mounted on said shaft and receiving recirculating air from said cabin;
    a cooling turbine mounted on said shaft and receiving said recirculating air from said compressor; and
    a mixing manifold receiving said recirculating air from said cooling turbine and said fresh air from said power turbine and delivering a mixture of the two to said cabin.

2. The system of claim 1 further comprising a primary heat exchanger disposed between said engine and said power turbine, said primary heat exchanger being mounted in a ram duct on said aircraft.

3. The system of claim 2 further comprising a secondary heat exchanger disposed between said compressor and said cooling turbine, said secondary heat exchanger being mounted in said ram duct downstream of said primary heat exchanger.

* * * * *